June 25, 1974   I. C. JONES, JR., ET AL   3,819,813
METHOD FOR PRODUCING AN ALKALI METAL CARBONATE
Filed Sept. 9, 1971
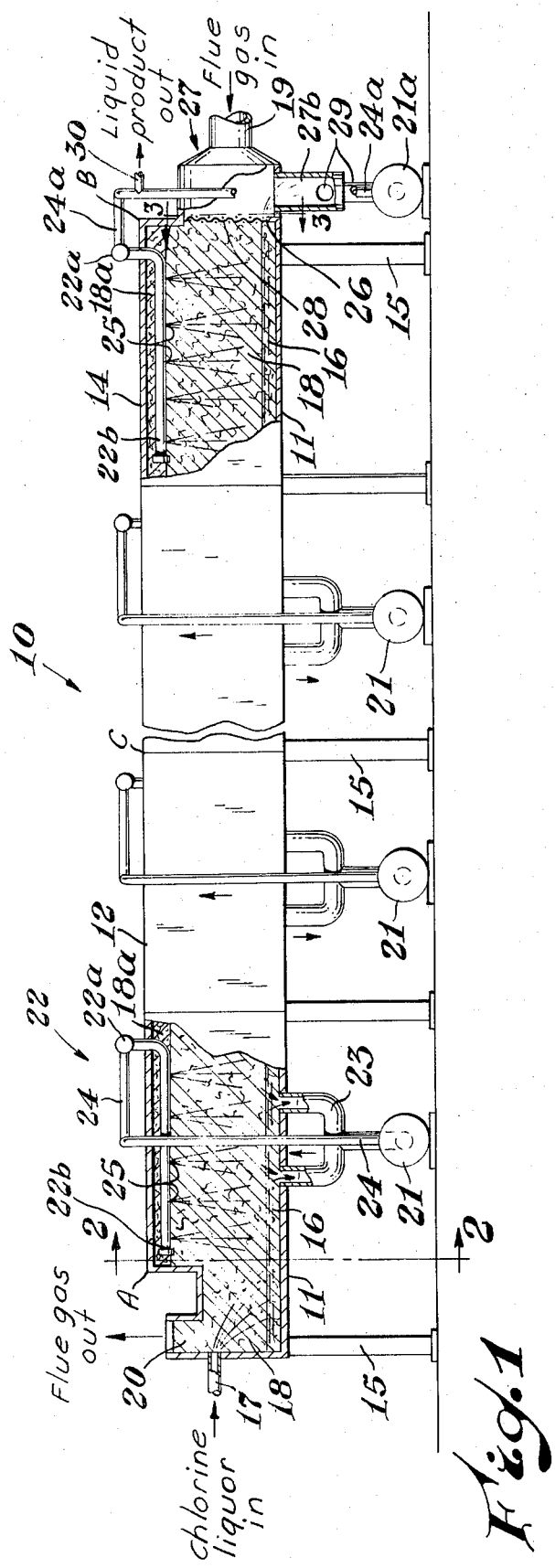
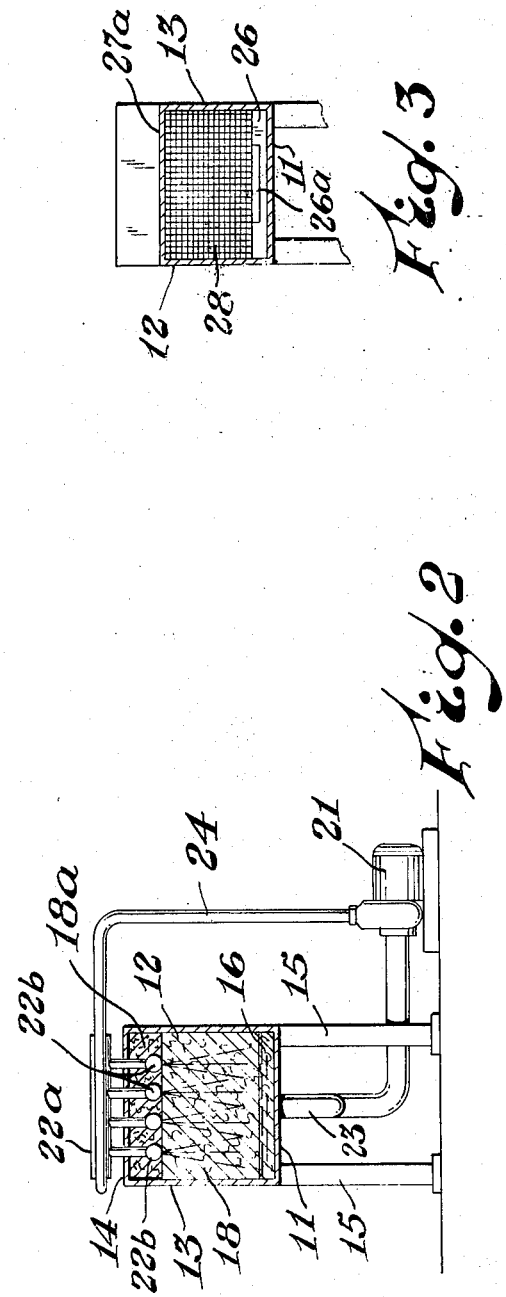
INVENTORS.
Irby C. Jones, Jr.
BY Walter E. Noack
V. Dean Clausen
AGENT.

United States Patent Office 3,819,813
Patented June 25, 1974

3,819,813
METHOD FOR PRODUCING AN ALKALI
METAL CARBONATE
Irby C. Jones, Jr., and Walter E. Noack, Lake Jackson, Tex., assignors to The Dow Chemical Company, Midland, Mich.
Filed Sept. 9, 1971, Ser. No. 179,087
Int. Cl. C01d 7/00
U.S. Cl. 423—421      4 Claims

ABSTRACT OF THE DISCLOSURE

In one embodiment of the invention, an alkali metal carbonate is obtained by reacting a gas containing carbon dioxide, such as flue gas, with an aqueous solution containing an alkali metal hydroxide, such as sodium hydroxide. The carbonator apparatus comprises basically a horizontally-positioned enclosed elongate conduit which contains a packing material. The flue gas is directed into the carbonator unit and moved horizontally through the packing material. Simultaneously, the aqueous alkali solution is also moved horizontally through the carbonator unit and a portion of the liquid stream is continuously recirculated vertically downwardly through the packing material. The reaction of the flue gas with the aqueous alkali solution produces an alkali metal carbonate solution, a portion of which is continuously withdrawn at one end of the carbonator unit for recovery of the solid product.

BACKGROUND OF THE INVENTION

The invention relates broadly to production of alkali metal carbonates. More specifically, the invention covers a novel method and apparatus for producing an alkali metal carbonate, such as sodium carbonate, by reacting a gas containing carbon dioxide with an aqueous solution of an alkali metal hydroxide, such as sodium hydroxide.

One of the common methods for producing an alkali metal carbonate is usually referred to as the countercurrent process. The procedure involves dropping an alkali-containing aqueous solution downwardly through a packing medium installed in a vertical tower. As the alkali solution falls vertically downwardly through the packing, it is contacted by an upwardly flowing gas containing carbon dioxide. From the standpoint of commercial feasibility the countercurrent method has several disadvantages.

A primary disadvantage of the countercurrent system is that it requires a precisely balanced gas to liquid flow rate to obtain a reasonable degree of utilization of the carbon dioxide in the reactant gas. For example, to obtain a high conversion of the alkali solution to a carbonate solution requires the use of extremely tall towers or a series of staged towers. A tall tower has the disadvantage that several distributor plates must be employed to redistribute the downwardly falling solution through the packing. The redistributor plates represent an obstacle to the upwardly flowing gas and thus substantially increase the gas pressure drop through the tower. In fact, the pressure drop in a vertical tower is usually high enough to require several blowers and a substantial amount of power to move the gases through the tower. In addition to the gas pressure factor in a vertical tower, another disadvantage is that a minimum amount of the alkali solution is required to completely wet the packing material. To obtain the desired carbonated product, therefore, the liquid flow rate is critical. Another drawback of the countercurrent process is that a substantial amount of the aqueous media usually becomes entrained in the effluent gas because of the relatively high driving force of the gas.

SUMMARY OF THE INVENTION

Accordingly, a broad object of the present invention is to provide a method and apparatus for producing an alkali metal carbonate which is more efficient and more economical than the countercurrent process and which does not have the disadvantages of the prior process.

A more specific object is to provide a method and apparatus for carbonating an alkali metal hydroxide solution to obtain an alkali metal carbonate, as accomplished by passing a carbon dioxide containing gas horizontally through a vertically falling stream of the alkali solution.

In general, the method of the invention involves continuously directing a gas stream containing carbon dioxide into an enclosed conduit which contains a packing medium. The gas stream is moved horizontally through the conduit and simultaneously an aqueous solution containing an alkali metal hydroxide is also continuously directed into the conduit and moved horizonally therethrough. As the alkali metal hydroxide solution moves through the conduit, a portion of the liquid stream is continuously recirculated vertically downwardly through the packing medium, so that it contacts the horizontally moving gas stream. Reaction of the gas stream with the liquid stream produces an aqueous solution of an alkali metal carbonate. A portion of the carbonate solution is continuously withdrawn from the conduit and carried to an apparatus for recovering the solid product.

DESCRIPTION OF THE DRAWINGS

FIG. 1 is a side elevation view, partly in section, of one embodiment of the carbonating apparatus of this invention.

FIG. 2 is a cross section view of the carobonating apparatus taken along line 2—2 of FIG. 1.

FIG. 3 is another cross-section view of the carbonating apparatus taken along line 3—3 of FIG. 1.

DESCRIPTION OF A PREFERRED EMBODIMENT

Referring to the drawing, in FIG. 1 is illustrated a preferred embodiment of a carbonating apparatus according to this invention. The body of the carbonating apparatus is defined generally by an enclosed elongate conduit 10, which has a bottom wall 11, side walls 12 and 13 and a top wall 14. In the embodiment illustrated herein the length of conduit 10 is approximately 60 feet, as measured between point A and point B in FIG. 1. In cross-sectional area, the conduit is approximately 2 feet wide by 2.5 feet high. Specifically, the complete carbonating unit is made up of three adjoining sections, each section being about 20 feet in length. To simplify the illustration, only one full section of the carbonating unit is shown. The full section illustrated in FIG. 1 is represented as that part of the unit which lies between point A and point C.

Several spaced apart legs 15 support the conduit 10 a short distance above ground level. The alkali solution to be carbonated, as indicated at 16, is directed into conduit 10 through an inlet fitting 17. As viewed in FIG. 1 the inlet fitting 17 is positioned at the left end of conduit 10. To provide a gas-liquid contact surface, the conduit 10 is filled to a depth of about 2 feet with a bottom layer of a conventional packing medium 18. A suitable packing material is a conventional thermoplastic, dump-type packing, such as Maspac brand packing (The Dow Chemical Company). The preferred packing material employed for the bottom layer is Maspac polypropylene SN90, size 3¾ inches. To enhance the gas-liquid contact surface, a second layer 18a of Maspac polypropylene packing, 2 inch size, is placed on top of the 3¾ inch packing. The top layer of packing has a depth of about 6 inches and extends up to top wall 14 so as to surround feeder pipes 22b (which are described in more detail hereinafter) thereby filling the gas-liquid contact area to prevent "short-circuiting" of the flue gas across the top of the packing.

The $CO_2$-containing gas for carbonating the aqueous alkali solution 16 is directed into conduit 10 through an inlet fitting 19. The fitting 19, as viewed in FIG. 1, is positioned at the right-hand end of conduit 10. As the carbonating gas enters conduit 10, it flows horizontally through the conduit from right to left as viewed in FIG. 1. The spent gas is exhausted through an open stack 20 above inlet fitting 17. A high conversion of the alkali-containing solution to a carbonated product is achieved by continuously recirculating the liquid through the horizontally-flowing gas stream. Means for recirculating the liquid are provided by several distributor units. Each distributor unit comprises a pump 21 and a dispenser apparatus, generally indicated at 22. Two of the distributor units are provided for each 20 foot section of the conduit 10, so that the entire carbonating apparatus has a total of six (6) distributor units.

As the solution 16 enters conduit 10 through fitting 17, it builds up a liquid "head" which forces it to flow horizontally toward the opposite end of the conduit. A portion of the liquid stream 16 is continuously withdrawn into each pump 21 through a Y fitting 23, which is connected into each pump. From pump 21 the liquid is forced upwardly through a feeder line 24, and into a header 22a, from which it is dispensed into four (4) separate feeder pipes 22b. From the feeder pipes 22b the liquid is forced downwardly, in a spray form, through a series of small holes 25 located on the underside of the feeder pipes.

In the carbonating apparatus of this invention, therefore, the recirculating liquid 16 is split into several separate streams, which are continuously sprayed vertically downwardly through the packing medium 18 and the horizontally flowing gas stream. The cross-flow contact of liquid with gas thus achieves the same effect as if the liquid were passed several times through a given stream of gas. This technique permits a substantially higher carbonation of the liquid reactant than has been possible in the countercurrent process.

At the right end of conduit 10, a weir member 26 is positioned at the juncture of a head member 27 with the bottom wall 11 of conduit 10. The purpose of weir member 26 is to maintain the liquid level in conduit 10 at a constant depth of from about 8 to 10 inches. A screen 28 is fitted between the upper edge of weir 26 and the upper wall 27a of head member 27. The screen, which is preferably fabricated of wire or a similar material, keeps the packing material 18 from falling into a sump portion 27b of head member 27. When the level of solution 16 rises above the upper edge of weir 26, the solution will spill over into sump portion 27b. Although it is not essential, it is preferred to provide a central slot 26a in the upper edge of weir 26.

From sump portion 27b, the solution is withdrawn into the end pump 21a through a return line 29. From pump 21a the solution is pumped upwardly through feeder line 24a and into header 22a and feeder pipes 22b, for "vertical" recirculation through the conduit 10, in the same manner as described hereinabove. A portion of the aqueous carbonated solution being recirculated through feeder line 24a is diverted into a branch line 30, which carries the solution to an appropriate apparatus (not shown) for recovering the solid carbonated product. The amount of carbonated liquid diverted through branch line 30 is regulated by an air-operated motor valve (not shown) installed in line 30. The valve in line 30, is in turn, operated by a differential pressure level control (not shown), which is attached to sump 27b, to control the level of the carbonated solution 16 which spills over into the sump.

Certain operating conditions and structural details will now be described. It will be understood that the practice of the invention is not limited to the precise details and conditions set out herein. The method and apparatus described herein are particularly adapted for producing alkali metal carbonates, such as sodium carbonate, potassium carbonate and lithium carbonate. The production of sodium carbonate represents a preferred form of the practice of the invention. In the production of sodium carbonate, a preferred alkali metal-containing solution is the cell effluent resulting from electrolysis of brine or sea water, which contains sodium hydroxide. The preferred carbonating gas is flue gas obtained from combustion of methane, which contains generally from about 8 percent to 10 percent carbon dioxide by volume. In the combustion of the flue gas, the mixture of fuel to air should be adjusted so as to obtain primarily carbon dioxide without producing an excessive amount of carbon monoxide. Carbon monoxide is a reducing gas which is detrimental to the desired carbonation of the alkali solution.

For the cross-flow carbonator of this invention, calculation of the mass transfer coefficient is based on a general equation which relates to vertical tower carbonating apparatus. The general equation, which is described in the literature (E. E. Ludwig, "Applied Process Design for Chemical and Petrochemical Plants," Gulf Publishing, Houston, vol. II, pp. 180–185), is as follows:

$$K_G a = \frac{n}{Z A \Delta p_{lm} f_a}$$

wherein:

$K_G a$ = Gas coefficient, lb. mols/(hr.) (cu. ft.) (atm.).
$n$ = $CO_2$ absorbed, lb. mols/hr.
$A$ = Tower cross-section area, sq. ft.
$Z$ = Height of packed section in tower, feet.
$\Delta p_{lm}$ = Log. mean partial pressure of gas in inlet and exit gas streams, atm.
$f_a$ = Fraction effective packing wetted.

Since the liquid stream and the gas stream in the cross-flow carbonator each occupy a different flow area, i.e., the streams are perpendicular to each other, the respective liquid and gas flow rates may be selected independently of each other. For this reason the mass transfer coefficient for the cross-flow carbonator is calculated from a modified version of the equation applicable to the vertical tower apparatus. The modified equation is as follows:

$$\frac{K_G a}{1.29} = \left(\frac{L/G}{9.92}\right).193 \left(\frac{T_{gas}}{704}\right).953$$

wherein:

$K_G a$ = Gas coefficient, lb. mols/(hr.) (cu. ft.) (atm.).
$L$ = Liquid recirculation rate, lb./hr./sq. ft.
$G$ = Gas loading rate, lb./hr./sq. ft.
$L/G$ = Ratio of amount of liquid that the gas contacts in passing through the carbonator.
$T_{gas}$ = Temperature of the gas stream.

Specific parameters for determining the mass transfer coefficient applicable to the cross-flow carbonator of this invention are generally as follows:

(A) The liquid recirculation rate (L) must be above a minimum value of about 2500 lbs./hr./sq. ft. in order to sufficiently "wet" the packing medium. A preferred range is from about 5000 to 7000 lbs./hr./sq. ft. For liquid recirculation the area factor is obtained from the sq. ft. area of the bottom wall 11 of conduit 10. In practice, the cross-flow carbonator has operated at a maximum liquid recirculation rate of about 9000 lbs./hr./sq. ft., with an observable improvement in the mass transfer coefficient.

(B) The preferred gas loading rate (G) is from about 400 to 800 lbs./hr./sq. ft., in order to minimize pressure loss in the carbonator. The area factor for the gas loading rate is based on the cross-sectional area of conduit 10.

The average pressure drop in the carbonator was found to be from about 0.025 to 0.05 inches of water per foot of packed length, based on the use of the Maspac polypropylene packing, as described hereinabove. Understandably, the pressure drop in the carbonator will vary accordingly to the type and size of the packing medium which is used.

(C) The liquid to gas ratio ($L/G$) refers to the amount of liquid that the gas contacts as the gas flows horizontally through the carbonator. The mass transfer rate is, of course, related to the liquid/gas ratio, i.e., an increase in either liquid rate or gas rate will increase the mass transfer rate. A minimum preferred value for this ratio is from about 6 to 7.

(D) An average gas inlet temperature is from about 65° F. to 300° F., with outlet temperatures ranging from about 160° F. to 170° F. In this temperature range it has been possible to achieve from about 85% to 100% carbonation, i.e., conversion of the NaOH solution to $Na_2CO_3$. However, since the rate of mass transfer increases with operation at higher temperatures, it is contemplated that 200% carbonation is possible in the cross-flow carbonator, i.e., reaction of the NaOH solution to $NaHCO_3$.

In the present carbonator the liquid recirculation rate and gas loading rate are directly related by the stoichiometry of the carobnation of the alkali-containing solution. Since the $CO_2$ concentration in the inlet and outlet gas phase constitutes the driving force for mass transfer, this concentration directly determines the volume of the unit required for a given amount of carbonation, for example, 100% carbonation or above. The present unit is designed to completely carbonate about 300 lbs./hr. NaOH from 225 lbs./hr. $CO_2$ in a 10% by volume stack gas stream. The flow rate of $CO_2$ in this instance represents about 136% of stoichiometry. In actual practice, however, the present unit has carbonated up to about 330 lbs./hr. NaOH from a $CO_2$ flow rate representing 110% of stoichiometry.

It will be appreciated, therefore, that the liquid recirculation rate and gas loading rate can be reduced considerably below the calculated design limit, while still achieving an acceptable carbonation level if the proper stoichiometric ratio of the liquid and gas streams is maintained. This feature of the cross-flow carbonator represents an operational flexibility having a distinct advantage over the prior vertical tower carbonating units. For example, in the cross-flow carbonator, this so-called "turndown ratio" is practically without limit. In a vertical tower carbonator, however, the liquid flow rate must be maintained at a critical minimum in order to sufficiently "wet" the packing.

With regard to structure, the conduit 10 is constructed of ¼ inch steel plate. Preferably, the conduit is lined on the inside with an epoxy resin, or a similar chemically inert material. The carbon dioxide-containing gas is obtained from burning of methane in a stainless steel duct (not shown) which connects into the inlet fitting 19. A model 5 V American blower is installed in the gas inlet line (not shown) above fitting 19 to move the gases through conduit 10. The pumps 21, which recirculate the carbonating solution 16 through the packing 18, are conventional circulating pumps. For the carbonating unit of this invention, which measures 2 feet wide, by 2½ feet high, by 60 feet long, the pumps employed are 2 by 3 Sherzer pumps. The pumping capacity of the recirculating pumps will, of course, depend on the volume of the carbonating unit and desired recirulation rate of the carbonate solution.

Various modifications of the apparatus described herein can be made without departing from the invention. For instance, as an alternative to the illustrated feeder pipes, the liquid circulated from the bottom of the gas-liquid contactor back to the top is pumped into trays above the packing and the water descends through the packing from multiple holes in the bottoms of the trays.

What is claimed:

1. A method for producing an aqueous solution of an alkali metal carbonate, which comprises the steps of:
    (a) continuously directing a gas stream containing carbon dioxide into an enclosed, horizontally-positioned conduit which has a top wall, side walls, and a bottom wall, and which contains a packing material, the inlet temperature of the gas stream being from about 65° F. to 300° F.;
    (b) moving the gas stream horizontally through the packing material contained in the conduit at a rate of from about 400 to 800 pounds per hour per square foot, based on the cross-sectional area of the said conduit;
    (c) continuously directing an aqueous solution stream containing an alkali metal hydroxide into the enclosed conduit and moving the aqueous stream horizontally through the conduit countercurrent to said gas stream;
    (d) continuously recirculating a portion of the moving aqueous alkali metal hydroxide stream through the packing material in a direction perpendicular to the horizontally moving gas stream to obtain an aqueous solution of an alkali metal carbonate, the aqueous stream being recirculated at a rate of from about 5000 to 7000 pounds per hour per square foot, based on the area of the bottom wall of the conduit; and
    (e) continuously withdrawing a portion of the said alkali metal carbonate solution from the enclosed conduit.

2. The method of Claim 1 in which the alkali metal hydroxide contained in the moving aqueous stream is sodium hydroxide and the alkali metal carbonate solution is a sodium carbonate solution.

3. The method of Claim 1 in which the alkali metal hydroxide contained in the moving aqueous stream is potassium hydroxide and the alkali metal carbonate solution is a potassium carbonate solution.

4. The method of Claim 1 in which the alkali metal hydroxide contained in the moving aqueous stream is lithium hydroxide and the alkali metal carbonate solution is a lithium carbonate solution.

References Cited
UNITED STATES PATENTS

| | | | |
|---|---|---|---|
| 3,202,477 | 8/1965 | Loeffler et al. | 423—421 |
| 3,103,413 | 9/1963 | Blumenthal | 423—421 |
| 3,254,946 | 6/1966 | Hass et al. | 423—421 |
| 3,292,913 | 12/1966 | Craig | 261—118 |
| 3,322,411 | 5/1967 | Moore | 261—96 |

OSCAR R. VERTIZ, Primary Examiner

J. COOPER, Assistant Examiner

U.S. Cl. X.R.

261—96, 98, 118